US012678800B2

(12) United States Patent
Koser

(10) Patent No.: US 12,678,800 B2
(45) Date of Patent: Jul. 14, 2026

(54) SYSTEMS AND METHODS FOR THREE-DIMENSIONAL EXTRACTION OF TARGET PARTICLES FERROFLUIDS

(71) Applicant: Ancera Inc., Branford, CT (US)

(72) Inventor: Hur Koser, Branford, CT (US)

(73) Assignee: ANCERA INC., Branford, CT (US)

( * ) Notice: Subject to any disclaimer, the term of this patent is extended or adjusted under 35 U.S.C. 154(b) by 128 days.

(21) Appl. No.: 16/113,793

(22) Filed: Aug. 27, 2018

(65) Prior Publication Data

US 2019/0091699 A1 Mar. 28, 2019

Related U.S. Application Data

(63) Continuation of application No. 14/777,504, filed as application No. PCT/US2014/028705 on Mar. 14, 2014, now abandoned.

(60) Provisional application No. 61/794,607, filed on Mar. 15, 2013.

(51) Int. Cl.
*B03C 1/28* (2006.01)
*B01L 3/00* (2006.01)
*B03C 1/033* (2006.01)

(52) U.S. Cl.
CPC .......... *B03C 1/288* (2013.01); *B01L 3/50273* (2013.01); *B01L 3/502761* (2013.01); *B03C 1/0332* (2013.01); *B03C 1/0335* (2013.01); *B01L 2200/0668* (2013.01); *B01L 2400/043* (2013.01); *B03C 2201/18* (2013.01); *B03C 2201/26* (2013.01)

(58) Field of Classification Search
CPC ..... B03C 1/288; B03C 1/0332; B03C 1/0335; B03C 2201/18; B03C 2201/26; B01L 3/50273; B01L 3/502761; B01L 2200/0668; B01L 2400/043
See application file for complete search history.

(56) References Cited

U.S. PATENT DOCUMENTS

| | | | |
|---|---|---|---|
| 3,202,576 | A | 8/1965 | Rogers et al. |
| 3,477,948 | A | 11/1969 | Inoue et al. |
| 3,764,540 | A | 10/1973 | Khalafalla et al. |
| 3,898,156 | A | 8/1975 | Kaiser et al. |
| 4,448,534 | A | 5/1984 | Wertz et al. |
| 4,935,147 | A | 6/1990 | Ullman et al. |
| 5,076,950 | A | 12/1991 | Ullman et al. |
| 5,194,133 | A | 3/1993 | Clark et al. |
| 5,439,586 | A | 8/1995 | Richards et al. |
| 5,932,100 | A | 8/1999 | Yager et al. |
| 5,998,224 | A | 12/1999 | Rohr et al. |
| 6,038,104 | A | 3/2000 | Sato et al. |
| 6,045,755 | A | 4/2000 | Lebl et al. |
| 6,303,389 | B1 | 10/2001 | Levin et al. |
| 6,309,889 | B1 | 10/2001 | Cutler et al. |
| 6,432,630 | B1 | 8/2002 | Blankenstein |
| 6,596,143 | B1 | 7/2003 | Wang et al. |
| 6,610,186 | B1 | 8/2003 | Mayer et al. |
| 6,620,627 | B1 | 9/2003 | Liberti et al. |
| 6,663,757 | B1 | 12/2003 | Fuhr et al. |
| 7,960,311 | B2 | 6/2011 | Carlson |
| 8,364,409 | B2 | 1/2013 | Rieder et al. |
| 8,961,878 | B2 | 2/2015 | Koser |
| 8,961,898 | B2 | 2/2015 | Nisisako et al. |
| 9,352,317 | B2 | 5/2016 | Koser |
| 9,415,398 | B2 | 8/2016 | Yellen et al. |
| 9,557,326 | B2 | 1/2017 | Inaba et al. |
| 9,726,592 | B2 | 8/2017 | Koser |
| 9,999,855 | B2 | 6/2018 | Koser |
| 10,302,634 | B2 | 5/2019 | Koser |
| 10,632,463 | B2 | 4/2020 | Koser |
| 10,782,223 | B2 | 9/2020 | Koser |
| 11,204,350 | B2 | 12/2021 | Koser |
| 11,285,490 | B2 | 3/2022 | Koser |
| 11,383,247 | B2 | 7/2022 | Koser |
| 2002/0003001 | A1* | 1/2002 | Weigl ...................... B01L 7/525 137/806 |
| 2002/0016751 | A1 | 2/2002 | Sekiya |
| 2002/0049782 | A1 | 4/2002 | Herzenberg et al. |
| 2002/0059132 | A1 | 5/2002 | Quay et al. |

(Continued)

FOREIGN PATENT DOCUMENTS

| | | | |
|---|---|---|---|
| CN | 101087655 | A | 12/2007 |
| CN | 201125246 | Y | 10/2008 |

(Continued)

OTHER PUBLICATIONS

Ashmatulu, R et al. A ferrofluid guided system for the rapid separation of the non-magnetic particles in a microfluidic device. Journal of Nanoscience and Nanotechnology. 2010. 10: 1-5. (Year: 2010).*

("Direction." Merriam-Webster.com. Merriam-Webster, https://www.merriam-webster.com/dictionary/direction. Accessed Jan. 13, 2024 (Year: 2024).*

Liang, L et al. Three-dimensional diamagnetic particle deflection in ferrofluid microchannel flows. Biomicrofluidics. 2011. 5: 034110. 13 pages. (Year: 2011).*

(Continued)

*Primary Examiner* — David W Berke-Schlessel
*Assistant Examiner* — Susan E. Fernandez
(74) *Attorney, Agent, or Firm* — Myers Bigel, P.A.

(57) ABSTRACT

Systems, methods and devices are presented for extracting target particles within a ferrofluid medium. In some embodiments, a fluidic channel receives a flow of a mix of one or more types of target particles, where at least one magnetic field source is configured to react with the flow such that a force (indirect or direct) is placed on the particles of the mix, across the width and/or the height of the fluidic channel. An extraction opening placed on one wall is provided and configured to extract at least one type of target particle.

17 Claims, 2 Drawing Sheets

(56) References Cited

U.S. PATENT DOCUMENTS

| | | | | |
|---|---|---|---|---|
| 2002/0106314 | A1 | 8/2002 | Pelrine et al. | |
| 2002/0144934 | A1 | 10/2002 | Exner | |
| 2003/0159999 | A1 | 8/2003 | Oakey et al. | |
| 2003/0203507 | A1 | 10/2003 | Liberti et al. | |
| 2003/0235504 | A1 | 12/2003 | Lemoff et al. | |
| 2004/0018611 | A1 | 1/2004 | Ward et al. | |
| 2004/0067167 | A1 | 4/2004 | Zhang et al. | |
| 2004/0096977 | A1 | 5/2004 | Rakestraw et al. | |
| 2005/0012579 | A1 | 1/2005 | Underwood et al. | |
| 2005/0199550 | A1 | 9/2005 | Haney et al. | |
| 2005/0233472 | A1 | 10/2005 | Kao et al. | |
| 2005/0237528 | A1 | 10/2005 | Oldham et al. | |
| 2005/0244932 | A1 | 11/2005 | Harding | |
| 2005/0266433 | A1 | 12/2005 | Kapur et al. | |
| 2005/0280811 | A1 | 12/2005 | Sandell | |
| 2006/0011305 | A1 | 1/2006 | Sandell et al. | |
| 2006/0011552 | A1 | 1/2006 | Utsunomiya | |
| 2006/0013984 | A1 | 1/2006 | Sandell et al. | |
| 2006/0024690 | A1 | 2/2006 | Kao et al. | |
| 2006/0024831 | A1 | 2/2006 | Kao et al. | |
| 2006/0029948 | A1 | 2/2006 | Lim et al. | |
| 2006/0166357 | A1 | 7/2006 | Takayama et al. | |
| 2006/0188399 | A1 | 8/2006 | Smid | |
| 2006/0286549 | A1 | 12/2006 | Sohn et al. | |
| 2007/0014694 | A1 | 1/2007 | Beard et al. | |
| 2007/0015289 | A1 | 1/2007 | Kao et al. | |
| 2007/0125971 | A1 | 6/2007 | Lee et al. | |
| 2007/0134809 | A1 | 6/2007 | Cho et al. | |
| 2007/0196820 | A1 | 8/2007 | Kapur et al. | |
| 2007/0215553 | A1 | 9/2007 | Yellen et al. | |
| 2007/0224084 | A1 | 9/2007 | Holmes et al. | |
| 2008/0000892 | A1 | 1/2008 | Hirano et al. | |
| 2008/0006202 | A1 | 1/2008 | Hirano et al. | |
| 2008/0035541 | A1 | 2/2008 | Franzreb et al. | |
| 2008/0038725 | A1 | 2/2008 | Luo et al. | |
| 2008/0148821 | A1 | 6/2008 | Donsky et al. | |
| 2008/0210560 | A1 | 9/2008 | Barringer | |
| 2008/0255006 | A1 | 10/2008 | Wang et al. | |
| 2008/0302732 | A1 | 12/2008 | Soh et al. | |
| 2009/0035838 | A1 | 2/2009 | Quake et al. | |
| 2009/0050569 | A1 | 2/2009 | Jung et al. | |
| 2009/0078614 | A1 | 3/2009 | Varghese et al. | |
| 2009/0148933 | A1 | 6/2009 | Battrell et al. | |
| 2009/0165876 | A1 | 7/2009 | Atkin et al. | |
| 2009/0175797 | A1 | 7/2009 | Warren et al. | |
| 2009/0220932 | A1 | 9/2009 | Ingber et al. | |
| 2009/0227044 | A1 | 9/2009 | Dosev et al. | |
| 2009/0251136 | A1 | 10/2009 | Prins et al. | |
| 2009/0325276 | A1 | 12/2009 | Battrell et al. | |
| 2010/0068824 | A1 | 3/2010 | Kimura | |
| 2010/0075340 | A1 | 3/2010 | Javanmard et al. | |
| 2010/0093052 | A1 | 4/2010 | Chalmers et al. | |
| 2010/0120077 | A1 | 5/2010 | Daridon | |
| 2011/0003392 | A1 | 1/2011 | Stayton et al. | |
| 2011/0020459 | A1 | 1/2011 | Achrol et al. | |
| 2011/0059468 | A1 | 3/2011 | Earhart et al. | |
| 2011/0065209 | A1 | 3/2011 | Heil et al. | |
| 2011/0114490 | A1 | 5/2011 | Pamula et al. | |
| 2011/0124116 | A1 | 5/2011 | Wohlstadter et al. | |
| 2011/0137018 | A1 | 6/2011 | Chang-Yen et al. | |
| 2011/0212440 | A1 | 9/2011 | Viovy et al. | |
| 2011/0262893 | A1 | 10/2011 | Dryga et al. | |
| 2011/0312518 | A1 | 12/2011 | Davis et al. | |
| 2012/0080360 | A1 | 4/2012 | Stone et al. | |
| 2012/0108470 | A1 | 5/2012 | Oh et al. | |
| 2012/0178645 | A1 | 7/2012 | Foekens et al. | |
| 2012/0190589 | A1 | 7/2012 | Anderson et al. | |
| 2012/0237997 | A1 | 9/2012 | Koser | |
| 2013/0140241 | A1 | 6/2013 | Yellen et al. | |
| 2013/0189794 | A1 | 7/2013 | Emeric et al. | |
| 2013/0261010 | A1 | 10/2013 | Bailey et al. | |
| 2013/0306566 | A1* | 11/2013 | Mao ...................... | C12N 13/00<br>210/695 |
| 2013/0313113 | A1 | 11/2013 | Koser | |
| 2014/0044600 | A1 | 2/2014 | McAlister | |
| 2014/0214583 | A1 | 7/2014 | Assuncao et al. | |
| 2014/0283945 | A1 | 9/2014 | Jones et al. | |
| 2015/0041396 | A1 | 2/2015 | Kelly et al. | |
| 2015/0151299 | A1 | 6/2015 | Koser | |
| 2016/0016171 | A1 | 1/2016 | Goel | |
| 2016/0188399 | A1 | 6/2016 | Benedict | |
| 2016/0263574 | A1 | 9/2016 | Smith et al. | |
| 2016/0266026 | A1 | 9/2016 | Koser | |
| 2016/0296944 | A1 | 10/2016 | Koser | |
| 2016/0296945 | A1 | 10/2016 | Koser | |
| 2016/0299052 | A1 | 10/2016 | Koser | |
| 2016/0299126 | A1 | 10/2016 | Koser | |
| 2016/0299132 | A1 | 10/2016 | Koser | |
| 2017/0122851 | A1 | 5/2017 | Thatcher et al. | |
| 2017/0259265 | A1 | 9/2017 | Diller et al. | |
| 2017/0285060 | A1 | 10/2017 | Koser | |
| 2017/0297028 | A1 | 10/2017 | Jones et al. | |
| 2018/0017557 | A1 | 1/2018 | Fritz et al. | |
| 2018/0029033 | A1 | 2/2018 | Koser | |
| 2018/0029035 | A1 | 2/2018 | Koser | |
| 2018/0128671 | A1 | 5/2018 | Paur et al. | |
| 2018/0128729 | A1 | 5/2018 | Koser | |
| 2018/0361397 | A1 | 12/2018 | Koser | |
| 2019/0118190 | A1 | 4/2019 | Koser | |
| 2019/0120822 | A1 | 4/2019 | Koser | |
| 2019/0339262 | A1 | 11/2019 | Koser | |
| 2020/0306758 | A1 | 10/2020 | Dhlakama | |
| 2020/0353466 | A1 | 11/2020 | Koser | |
| 2022/0107311 | A1 | 4/2022 | Koser | |
| 2022/0212201 | A1 | 7/2022 | Koser | |

FOREIGN PATENT DOCUMENTS

| | | | | |
|---|---|---|---|---|
| CN | 104535783 | A | 4/2015 | |
| CN | 105142789 | A | 12/2015 | |
| JP | 2006187770 | A | 7/2006 | |
| JP | 2009511001 | A | 3/2009 | |
| JP | 2009133818 | A | 6/2009 | |
| WO | WO 1991/001381 | A1 | 2/1991 | |
| WO | WO 2006/004558 | A1 | 1/2006 | |
| WO | WO 2006/067715 | A2 | 6/2006 | |
| WO | WO 2008/042003 | A2 | 4/2008 | |
| WO | WO-2008130977 | A2 | 10/2008 | |
| WO | WO-2010117458 | A1 * | 10/2010 | ............... B03C 1/01 |
| WO | WO 2011/071812 | A2 | 6/2011 | |
| WO | WO 2011/071912 | A1 | 6/2011 | |
| WO | WO 2011/139233 | A1 | 11/2011 | |
| WO | WO 2012/057878 | A1 | 5/2012 | |
| WO | WO-2012142664 | A1 * | 10/2012 | ............. G01N 11/00 |
| WO | WO 2013/054311 | A1 | 4/2013 | |
| WO | WO 2013/155525 | A1 | 10/2013 | |
| WO | WO-2014100456 | A1 | 6/2014 | |
| WO | WO 2014/044810 | A1 | 9/2014 | |
| WO | WO 2014/144340 | A1 | 9/2014 | |
| WO | WO 2014/144782 | A2 | 9/2014 | |
| WO | WO 2014/145765 | A1 | 9/2014 | |
| WO | WO-2014144810 | A1 | 9/2014 | |
| WO | WO 2014/065317 | A1 | 10/2014 | |
| WO | WO-2016210348 | A2 | 12/2016 | |
| WO | WO 2017/004595 | A1 | 1/2017 | |
| WO | WO-2017085098 | A1 | 5/2017 | |
| WO | WO-2017192633 | A1 | 11/2017 | |
| WO | WO-2018026605 | A1 | 2/2018 | |
| WO | WO-2019103741 | A1 | 5/2019 | |
| WO | WO-2019117877 | A1 | 6/2019 | |
| WO | WO-2022015845 | A2 | 1/2022 | |
| WO | WO-2022169905 | A1 | 8/2022 | |

OTHER PUBLICATIONS

Non-Final Office Action mailed Aug. 8, 2017 for U.S. Appl. No. 14/777,504, 11 pages.

Final Office Action mailed Feb. 27, 2018 for U.S. Appl. No. 14/777,504, 10 pages.

Non-Final Office Action mailed Apr. 28, 2017 for U.S. Appl. No. 14/777,505, 24 pages.

Final Office Action mailed Dec. 20, 2017 for U.S. Appl. No. 14/777,505, 25 pages.

(56) References Cited

OTHER PUBLICATIONS

Non-Final Office Action mailed Aug. 1, 2017 for U.S. Appl. No. 14/777,512, 18 pages.
Final Office Action mailed Dec. 22, 2017 for U.S. Appl. No. 14/777,512, 13 pages.
Non-Final Office Action mailed Aug. 31, 2018 for U.S. Appl. No. 15/623,134, 12 pages.
Final Office Action mailed Apr. 8, 2019 for U.S. Appl. No. 15/623,134, 13 pages.
Non-Final Office Action mailed Jan. 20, 2017 for U.S. Appl. No. 14/777,511, 13 pages.
Final Office Action mailed Aug. 31, 2017 for U.S. Appl. No. 14/777,511, 12 pages.
Non-Final Office Action mailed Jul. 16, 2018 for U.S. Appl. No. 14/777,511, 14 pages.
Final Office Action mailed Feb. 21, 2019 for U.S. Appl. No. 14/777,511, 18 pages.
Non-Final Office Action mailed Jun. 2, 2017 for U.S. Appl. No. 14/777,507, 10 pages.
Final Office Action mailed Nov. 17, 2017 for U.S. Appl. No. 14/777,507, 14 pages.
Non-Final Office Action mailed Feb. 12, 2018 for U.S. Appl. No. 14/827,073, 25 pages.
Non-Final Office Action mailed Apr. 5, 2019 for U.S. Appl. No. 15/739,466, 8 pages.
Non-Final Office Action mailed Jul. 5, 2018 for U.S. Appl. No. 15/740,288, 12 pages.
Non-Final Office Action mailed Sep. 14, 2016 for U.S. Appl. No. 13/882,013, 5 pages.
Final Office Action mailed Feb. 21, 2017 for U.S. Appl. No. 13/882,013, 6 pages.
Non-Final Office Action mailed Sep. 25, 2017 for U.S. Appl. No. 13/882,013, 6 pages.
Non-Final Office Action mailed Jul. 31, 2013 for U.S. Appl. No. 13/514,331, 11 pages.
Final Office Action mailed Apr. 24, 2014 for U.S. Appl. No. 13/514,331, 16 pages.
Non-Final Office Action mailed Apr. 1, 2015 for U.S. Appl. No. 14/591,492, 7 pages.
Non-Final Office Action mailed Jun. 30, 2016 for U.S. Appl. No. 15/163,890, 8 pages.
Final Office Action mailed Mar. 13, 2017 for U.S. Appl. No. 15/163,890, 8 pages.
International Search Report and Written Opinion mailed Oct. 18, 2011 for International Application No. PCT/US2011/039516, 7 pages.
Examination Report No. 1 dated Nov. 18, 2016 for Australian Application No. 2015268583, 4 pages.
Extended European Search Report dated Dec. 13, 2017 for European Application No. 11836778.8, 9 pages.
International Search Report and Written Opinion mailed Feb. 8, 2011 for International Application No. PCT/US2010/059270, 10 pages.
Extended European Search Report dated Dec. 11, 2017 for European Application No. 10836542.0, 10 pages.
International Search Report and Written Opinion mailed Aug. 5, 2014 for International Application No. PCT/US2014/028705, 6 pages.
International Search Report and Written Opinion mailed Oct. 4, 2014 for International Application No. PCT/US2014/029336, 12 pages.
International Search Report and Written Opinion mailed Aug. 11, 2014 for International Application No. PCT/US2014/030584, 7 pages.
International Search Report and Written Opinion mailed Aug. 5, 2014 for International Application No. PCT/US2014/029376, 9 pages.
International Search Report and Written Opinion mailed Aug. 20, 2014 for International Application No. PCT/US2014/030629, 9 pages.
International Search Report and Written Opinion mailed Dec. 23, 2016 for International Application No. PCT/US2016/039394, 8 pages.
International Search Report and Written Opinion mailed Sep. 13, 2016 for International Application No. PCT/US2016/040861, 6 pages.
International Search Report and Written Opinion mailed Oct. 6, 2017 for International Application No. PCT/US2017/043985, 9 pages.
Applegate et al., "Optical trapping, manipulation, and sorting of cells and colloids in microfluidic systems with diode laser bars," Optical Express 12:4390-4398 (2004).
Ashkin et al., "Optical trapping and manipulation of single cells using infrared laser beams," Nature 330:769-771 (1987).
Ashkin et al., "Optical trapping and manipulation of virsuses and bacteria," Science 235:1517-1520 (1987).
Bautista et al., "Comparative study of ferrofluids based on dextran-coated iron oxide and metal nanoparticles for contrast agents in magnetic resonance imaging," Nanotechnology 15:S154-S159 (2004).
Beyor et al., "Immunomagnetic bead-based cell concentration microdevice for dilute pathogen detection," Biomed Microdevices 10:909-917 (2008).
Blattner et al., "The complete genome sequence of *Escherichia coli* K-12," Science 277:1453-1474 (1997).
Cabrera et al., "Continuous concentration of bacteria in a microfluidic flow cell using electrokinetic techniques," Electrophoresis 22:355-362 (2001).
Castagiuolo et al., "Engineered *E. coli* delivers therapeutic genes to the colonic mucosa," Gene Therapy 12:1070-1078 (2005).
Cheong et al., "Gold nanoparticles for one step DNA extraction and real-time PCR of pathogens in a single chamber," Lab Chip 8:810-813 (2008).
Chiou et al., "Massively parallel manipulation of single cells and microparticles using optical images," Nature 436:370-372 (2005).
Davis et al., "Deterministic hydrodynamics: Taking blood apart," Proc Natl Acad Sci USA 103:14779-14784 (2006).
Dittrich et al., "Lab-on-a-chip: microfluidics in drug discovery," Nat. Rev. Drug Discovery 5:210-218 (2006).
Dufresne et al., "Optical tweezer arrays and optical substrates created with diffractive optics," Rev Sci Instrum 69:1974-1977 (1998).
Dumesny et al., "Synthesis, expression and biological activity of the prohormone for gastrin releasing peptide," Endocrinology 147(1):502-509 (2006).
Fischer et al., Ferro-microfluidic device for pathogen detection, IEEE Int Conf on Nano/Micro Eng and Molecular System China, 907-910 (2008).
GIJS, "Magnetic bead handling on-chip: new opportunities for analytical applications," Microfluidics Nanofluidics 1:22-40 (2004).
Goldman et al., "Slow viscous motion of a sphere parallel to a plane wall-I motion through a quiescent fluid," Chem Eng Sci 22:637-651 (1967).
Green, "The Sigma-Aldrich Handbook of Stains, Dyes & Indicators," Aldrich Chemical Co., Milwaukee, WI, 721-722 (1990).
Han et al., Kynurenine aminotransferase and glutamine transaminase K of *Escherichia coli*: Identity with aspartate aminotransferase, Biochemical Journal 360(3):617-623 (2001).
Horan et al., "Stable cell membrane labeling," Nature 340:167-168 (1989).
Hughes, "Strategies for dielectrophoretic separation in laboratory-on-a-chip systems," Electrophoresis 23:2569-2582 (2002).
ISE, "When, why, and how does like like like?—Electrostatic attraction between similarly charged species," Proc Jpn Acad B Phys Biol Sci 83:192-198 (2007).
Jayashree et al., "Identification and Characterization of Bile Salt Hydrolase Genese from the Genome of Lactobacillus fermentum MTCC 8711," Applied Biochemistry and Biotechnology 174(2):855-866 (2014).
Kamei et al., "Microfluidic Genetic Analysis with an Integrated a-Si:H Detector," Biomed Microdevices 7:147-152 (2005).
Kashevsky, "Nonmagnetic particles in magnetic fluid: Reversal dynamics under rotating field," Phys Fluids 9:1811-1818 (1997).

(56) References Cited

OTHER PUBLICATIONS

Kim et al., "Synthesis of ferroflid with magnetic nanoparticles by sonochemical method for MRI contrast agent," J Magn Magn Mater 289:328-330 (2005).
Kim et al., "Cloning and characterization of the bile salt hydrolase genes (bsh) from Bifidobacterium bifidum strains," Applied and Environmental Biology 70(9):5603-5612 (2004).
Kose et al., "Towards Ferro-microfluidics for Effective and Rapid Cellular Manipulation and Sorting," Proceedings of the IEEE Int. Conf. on Nano/Microengineered and Molecular Systems, Jan. 6-9, 2008, pp. 903-906.
Kose et al., "Label-free cellular manipulation and sorting via biocompatible ferrofluids," Proc. Nat'l. Acad. Sci. USA, 106(51):21478-21483 (2009).
Kose et al., "Supporting information to Label-free cellular manipulation and sorting via biocompatible microfluids," Proceedings of the National Academy of Sciences USA; retrieved from the Internet: http://www.pnas.org/content/suppl/2009/12/07/0912138106.DCSupplemental/Appendix.PDF.pdf (2009).
Kremser et al., "Capillary electrophoresis of biological particles: Viruses, bacteria, and eukaryotic cells," Electrophoresis 25:2282-2291 (2004).
Kumar et al., "Molecular cloning, characterization and heterologous expression of bile salt hydrolase (bsh) from Lactobacillus fermentum NCD0394," Molecular Biology Reports 40(8):5057-5066 (2013).
Lee et al., "Microelectromagnets for the control of magnetic nanoparticles," Appl Phys Lett 79:3308-3310 (2001).
Lekka et al., "Elasticity of normal and cancerous human bladder cells studies by scanning force microscopy," Eur Biophys J 28:312-316 (1999).
Liu et al., "Evidence for Localized Cell Heating Induced by Infrared Optical Tweezers," Biophys J 68:2137-2144 (1995).
Maiorov, "Experimental Study of the Permeability of a ferrofluid in an alternating magnetic field," Magneetohydrodynamics 15:135-139 (1979).
Mao et al., "Towards ferrofluidics for µ-TAS and lab on-a-chip applications," Nanotechnology 17:34-47 (2006).
Massart, "Preparation of Aqueous Magnetic Liquids in Alkaline and Acid Media," IEEE Trans Magn 17:1247-1248 (1981).
Menachery et al., Controlling cell destruction using dielectrophoretic forces, NanoBiotechnology 152:145-149 (2005).
Muller et al., "The Potential of Dielectrophoresis for Single-Cell Experiments," IEEE Eng Biol Med Mag 22:51-61 (2003).
Pethig et al., "Applications of dielectrophoresis in biotechnology," Trends Biotechnol 15:426-432 (1997).
Romasi et al., "Development of Indole-3-Acetic Acid-Producing *Escherichia coli* by Functional Expression of IpdC, AspC, and lad1," Journal of Microbiology and Biotechnology 23(12):1726-1736 (2013).
Sarsero et al., "A new family of integral membrane proteins involved in transport of aromatic amino acids in *Escherichia-coli*," Journal of Bacteriology 173(10):3231-3234 (1991).
Sebastian et al., "Formation of multilayer aggregates of mammalian cells by dielectrophoresis," J Micromech Microeng 16:1769-1777 (2006).
Scherer et al., Ferrofluids: Properties and Applications, Brazilian J Phys 45:718-727 (2005).
Steidler et al., "Genetically engineered Probiotics," Baillier's Best Practice and Research. Clinical Gastroenterology 17(5): 861-876 (2003).
Tung et al., "Magnetic properties of ultrafine cobalt ferrite particles," J Appl Phys 93:7486-7488 (2003).
Wang et al., "Expression of rat pro cholecystokinin (CCK) in bacteria and in insect cells infected with recombinant Baculovirus," Peptides 18(9):1295-1299 (1997).
Whelan et al., "A Transgenic Probiotic Secreting a Parasite Immunomodulator for Site-Directed Treatment of Gut Inflammation," Molecular Therapy 22(10):1730-1740 (2014).
Yan et al., "Near-field-magnetic-tweezer manipulation of single DNA molecules," Phys Rev E 70:011905 (2004).
Yellen et al., "Arranging matter by magnetic nanoparticle assemblers," Proc Natl Acad Sci USA 102:8860-8864 (2005).
Zahn et al., "Ferrohydrodynamic pumping in spatially uniform sinusoidally time-varying magnetic fields," J of Magnetism and Magnetic Materials 149:165-173 (1995).
Zhang et al., "A microfluidic system with surface modified piezoelectric sensor for trapping and detection of cancer cells," Biosens Bioelectron 26(2):935-939 (2010).
Zhang et al., "Low temperature and glucose enhanced T7 RNA polymerase-based plasmid stability for increasing expression of glucagon-like peptide-2 in *Escherichia coli*," Protein Expression and Purification 29(1):132-139 (2003).
Non-Final Office Action mailed Jan. 16, 2020 for U.S. Appl. No. 15/623,134, 10 pages.
Non-Final Office Action mailed Jun. 14, 2019 for U.S. Appl. No. 15/982,926, 19 pages.
Final Office Action mailed Dec. 12, 2019 for U.S. Appl. No. 15/739,466, 9 pages.
Non-Final Office Action mailed Jan. 28, 2021 for U.S. Appl. No. 15/739,466, 9 pages.
Non-Final Office Action mailed Jan. 27, 2020 for U.S. Appl. No. 15/708,032, 10 pages.
Non-Final Office Action mailed Jul. 12, 2019 for U.S. Appl. No. 15/660,616, 17 pages.
Final Office Action mailed Jan. 17, 2020 for U.S. Appl. No. 15/660,616, 14 pages.
Final Office Action mailed Mar. 18, 2021 for U.S. Appl. No. 15/660,616, 22 pages.
Non-Final Office Action mailed Aug. 22, 2019 for U.S. Appl. No. 15/660,606, 10 pages.
Non-Final Office Action mailed Jun. 26, 2019 for U.S. Appl. No. 15/670,264, 11 pages.
First Office Action dated Feb. 20, 2021 for Chinese Application No. 201780060346.2, with English language translation, 12 pages.
International Search Report and Written Opinion mailed Feb. 22, 2018 for International Application No. PCT/US2017/065883, 13 pages.
Extended European Search Report dated Jun. 14, 2021 for European Application No. 17934894.1, 6 pages.
Kang et al., "Monitoring of anticancer effect of cisplatin and 5-fluorouracil on HepG2 cells by quartz crystal microbalance and micro CCD camera," Biosensors and Bioelectronics 26:1576-1581 (2010).
Kose et al., "Ferrofluid mediated nanocytometry," Lab Chip 12:190-196 (2012).
Primiceri et al., "Cell chips as new tools for cell biology—results, perspectives and opportunities," Lab Chip 13:3789-3802 (2013).
Bushkin, G.G., et al., "Evidence for a Structural Role for Acid-fast Lipids in Oocyst Walls of Cryptosporidium, Toxoplasma, and Eimeria," MBIO, Nov. 1, 2013, vol. 4(5), XP55917717.
Examination Report dated Oct. 1, 2021 for European Application No. 17837424.5, 6 pages.
Extended European Search Report dated Mar. 12, 2020 for European Application No. 17837424.5, 15 pages.
International Preliminary Report on Patentability for International Application No. PCT/US2021/041616 dated Jan. 26, 2023, 17 pages.
International Search Report and Written Opinion for International Application No. PCT/US2022/014987, mailed May 17, 2022, 19 pages.
International Search Report and Written Opinion mailed Dec. 1, 2022 for International Application No. PCT/US2021/041616, 22 pages.
Non Final Office Action for U.S. Appl. No. 16/419,982, dated Nov. 22, 2022, 14 pages.
Non-Final Office Action for U.S. Appl. No. 17/704,820 mailed on Dec. 2, 2022, 10 pages.
Non-Final Office Action mailed Oct. 14, 2021 for U.S. Appl. No. 16/013,793, 8 pages.
Non-Final Office Action mailed Oct. 31, 2022 for U.S. Appl. No. 16/772,681, 22 pages.
Non-Final Office Action mailed Sep. 10, 2021 for U.S. Appl. No. 16/772,681, 20 pages.

(56) References Cited

OTHER PUBLICATIONS

Non-Final Office Action mailed Sep. 21, 2022 for U.S. Appl. No. 16/859,431, 14 pages.
Notice of Allowance for U.S. Appl. No. 16/859,431 dated Apr. 14, 2023, 9 pages.
Notice of Allowance for U.S. Appl. No. 16/859,431 mailed May 1, 2023, 2 pages.
Notice of Allowance for U.S. Appl. No. 17/704,820, dated May 2, 2023, 8 pages.
Office Action dated Feb. 21, 2022 for Canadian Application No. 2,902,324, 3 pages.
Office Action for Chinese Application No. CN201780097630, mailed on Mar. 31, 2022, 12 pages.
Office Action for Indian Application No. IN5808/DELNP/2012 mailed Jan. 24, 2023, 3 pages.
Seltmann, A., et al., "Age-specific Gastrointestinal Parasite Shedding in Free-ranging Cheetahs (Acinonyx Jubatus) on Namibian Farmland," Parasitology Research, Jan. 31, 2019, vol. 118(3), pp. 851-859.
Songbai. T, et al., "A digital quantification method for the detection of biomarkers on a microfluidic array chip," Sensors & Actuators: B. Chemical 298 (2019) 126851, 7 pages.

* cited by examiner

SYSTEMS AND METHODS FOR THREE-DIMENSIONAL EXTRACTION OF TARGET PARTICLES FERROFLUIDS

RELATED APPLICATIONS

This application is a continuation of and claims priority to U.S. patent application Ser. No. 14/777,504, filed Sep. 15, 2015, which in turn is a national stage application of and claims priority to PCT Application No. PCT/US2014/028705, filed Mar. 14, 2014, which in turn claims priority to and benefit of U.S. Provisional Patent Application No. 61/794,607, filed Mar. 15, 2013. The present application incorporates herein by reference the disclosures of each of the above-referenced applications in their entireties.

FIELD OF THE DISCLOSURE

The present disclosure relates to extraction in biocompatible ferrofluids and in particular, to systems and methods for separating a cells and/or other target particles suspended in a ferrofluid (e.g., a biocompatible ferrofluid).

BACKGROUND OF THE DISCLOSURE

As shown in FIG. 1, as the inventor's prior disclosures describe, i.e., WO2011/071912 and WO2012/057878, concentrating and extracting target moieties within microfluidics may be accomplished two-dimensionally, by placing a ferrofluid containing the target moieties within at least one micro/flow channel, and applying a magnetic field. The magnetic field is configured to effect an indirect force on the target moieties such that they are focused/separated into different streamlines of particles across the width of the flow channel. The streamlines that carry the target moieties are then extracted at the end of the channel via multiple outlets in the plane of the flow channel.

To that end, such approaches may be limited by the resolution with which the width of the streamlines carrying the focused moieties are aligned with a particular outlet channel for extracting those streamlines. Pulsations, or other non-steady pressure effects originating from, for example, pumps, geometry/elasticity of liquid channels/connectors, trapped air bubbles, partial blockages due to particles flowing through narrow geometries, and the like, can all add to time-dependent deviations in the ultimate trajectories of the target moieties.

SUMMARY OF THE DISCLOSURE

Embodiments of this disclosure correspond to further developments and applications of the inventor's previous series of disclosures, including, for example PCT publication no. WO2011/071912 and WO2012/057878, the noted disclosures of which are all herein incorporated by reference in their entireties.

Accordingly, in some embodiments, a method for extracting particles within a ferrofluid medium is provided. The method may comprise flowing a mix comprising a ferrofluid medium containing one or more types of target particles through at least one microfluidic channel. The at least one channel having a first inlet portion for receiving the flow and a second portion spaced downstream from the first portion, a first side spaced away from a second side and comprising to a width of the channel, and a third side spaced away from a fourth side and comprising a height of the channel, wherein the mix flows through the channel in a first direction from the first portion to the second portion. The method may also include applying a magnetic field adjacent at least one of the sides of the channel, the magnetic field configured to concentrate at least one type of target particle contained in the mix medium within a width region comprising a portion of the width and a height region comprising a portion of the height, the height region being located at or adjacent to the third side, such that the at least one first type of target particles from the flow are concentrated within the width region and the height region creating a concentrated flow of target particles. The method may also include extracting a flow of concentrated target particles of the first type from the mix via an extraction opening arranged on the third side at or near the second portion, where the flow of target particles of the first type from the extraction opening includes an exit velocity.

In some embodiments, a system for extracting particles within a ferrofluid medium is provided. Such embodiments may include at least one microfluidic channel having a first inlet portion and a second portion spaced downstream from the first portion for receiving a flow of a mix comprising a ferrofluid medium containing one or more types of target particle, a first side spaced away from a second side and comprising a width of the fluidic channel, and a third side spaced away from a fourth side and comprising a height of the fluidic channel. The fluid flows through the fluidic channel in a first direction from the first end to the second end. The system may also include magnetic field means arranged adjacent at least one of the sides of the fluidic channel, the magnetic field configured to focus at least one type of target particles contained in the ferrofluid medium flow within a width region comprising a portion of the width and a height region comprising a portion of the height. The height region being located at or adjacent to the third side, such that the target particles from the flow are concentrated within the width region and the height region creating a concentrated flow of particles. The system may further include an extraction opening arranged on the third side at or near the second end, the extraction opening configured to receive and direct the concentrated flow of target particles from the fluidic channel at an exit velocity.

Embodiments of the disclosure may further include one or more of the following features:

- the target particles comprise at least one of target moieties and target biological cells;
- the extraction opening having a shape comprising round, circular, square, a slit, rectangular, triangular and elliptical;
- the magnetic field means comprises at least one of one or more current-carrying electrodes and one or more magnets;
- velocity adjustment means;
- the velocity adjustment means comprises flow resistance means;
- the velocity adjustment means comprises at least one of: adjusting the magnetic field to effect forces on the flow affecting the exit velocity, the size of the extraction opening is configured to increase velocity, controlling the flow resistance from the extraction opening, and providing at least one of a pressure sink and a flow sink arranged downstream of the extraction opening.

The above-noted embodiments, as well as other embodiments, will become even more evident with reference to the following detailed description and associated drawing, a brief description of which is provided below.

DETAILED DESCRIPTION OF SOME OF THE EMBODIMENTS

Figure 1:
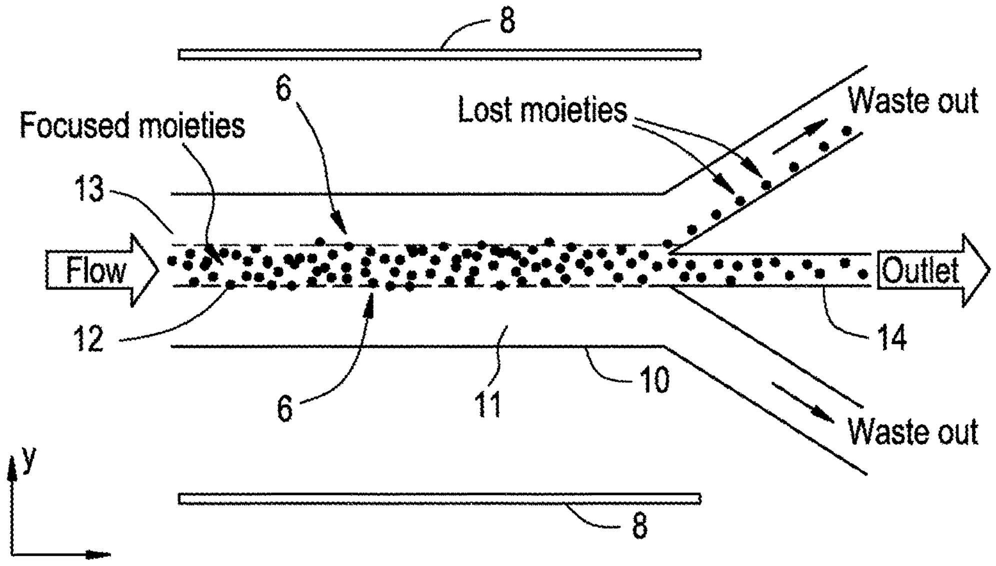
FIG. 1 is the illustrative structures of a microfluidic platform that performs concentration/enrichment of a target moiety.

FIG. 1 shows a top view of a microfluidic channel 10 configured to perform concentration/enrichment of target particles 12 (e.g., moieties) from a ferrofluid flow 11 (e.g., comprising a mix of target particles and a ferrofluid medium). In such cases, the alignment of the focused target particles with an outlet 14 stream determines the concentration efficiency and loss. As is shown, magnetic field means 8 (which may comprise at least one of an electrode, a permanent magnet, and an electromagnet) applies a magnet field which is configured to focus target particles of the mix in a stream (e.g., see focusing boundaries 6). Misalignments due to device construction or pressure variations may limit the effective enrichment factor. While the magnetic field means are shown simply as two bars above/below the schematic of the channel, it is understood that the magnetic field means may be positioned anywhere relative to the flow which would affect the functionality of focusing/separating target particles (see, e.g., WO2011/071912 and WO2012/057878)

Figure 2:
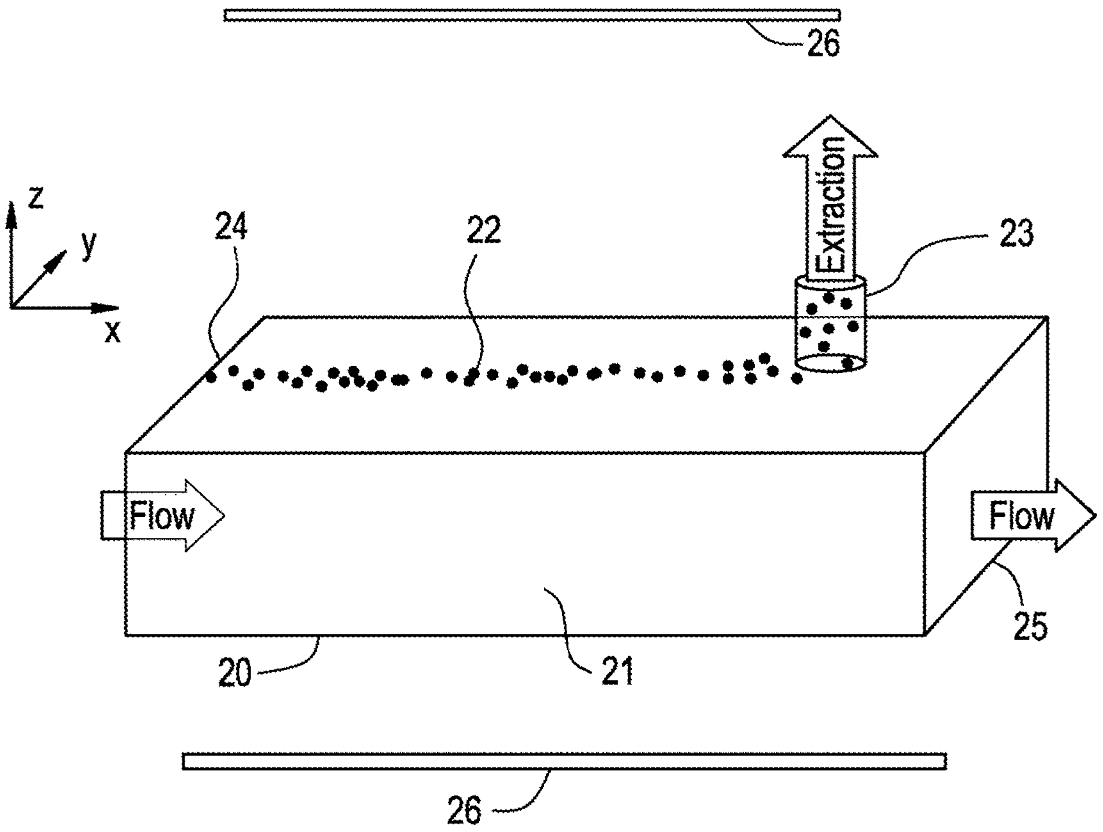
FIG. 2 is a schematic illustration of a system for extracting target particles from a ferrofluid medium according to some embodiments of the present disclosure.

FIG. 2 illustrates concepts according to some embodiments, which may be referred to as "blow-hole" extraction. In such embodiments, for example, target particles 22 are suspended in a magnetic liquid medium 21 (e.g., a ferrofluid medium) forming a mix, where the target particles may comprise one or more types of particles (e.g., one more types of biological particles—e.g., cells, moieties, and the like), and flowed through one or more microfluidic channels 20 of an extraction and/or microfluidic system. Types of target particles also may be (and may be in addition to being a biological particle) based on at least one of size, shape, features, mass and charge. The fluidic channel(s) 20 may be provided for in a cartridge configured to be removable from a general system for each new particle extraction. Magnetic field applying means 26, which may comprise any one or more of electrodes and magnets, may be positioned adjacent at least one side of the fluidic channel, and are simply shown adjacent the channel in FIG. 2; however, it will be understood that the magnetic field means is positioned relative to the channel(s) to effect the separation functionality of at least some of the embodiments taught by this disclosure.

In some embodiments, the magnetic fields are configured to act upon the mix/ferrofluid 21 such that target particles 22 are concentrated, focused, or otherwise separated (these terms used interchangeably throughout), along a portion of the flow. For example, in some embodiments, a fluidic cartridge, having for example parallel microfluidic channels 20, is arranged adjacent (e.g., on top of) one or more current-carrying electrodes and/or magnets. Upon activation of the magnetic field, the target particles 22 become concentrated, for example, along a central portion of the fluid flow from an inlet 24 end/portion to an outlet end/portion 25 (e.g., an end/portion of the channel which is spaced apart from the inlet end), and, in some embodiments, the magnetic field also is configured to concentrate the target particles along one side of the fluidic channel.

For example, if the magnetic field means is placed below the cartridge, it may be configured to direct the target particles in a concentrated stream within the center of the fluid flow, and may also (or in place of) concentrate the target particles along the "ceiling" (e.g., a side) of the channel (relative to the "floor" of the channel, in, for example, a vertical direction).

Accordingly, in some embodiments, an extraction opening/orifice/hole 23 is arranged downstream from the inlet end 24 of the channel 20, on the "ceiling" side, from which the concentrated flow of target particles (e.g., the target particles themselves) may be extracted therefrom (FIG. 2). The velocity or speed of the flow of concentrated target particles from the extraction opening 23 may be adjusted either passively, by controlling flow resistance of the extraction orifice or main ferrofluid flow, and/or actively via the incorporation of a pressure of flow sink downstream of the extraction orifice (e.g., an outlet to the microfluidic channel). Likewise, the magnetic field may be configured to effect the velocity, in some embodiments, of particles being extracted via the extraction opening. The extraction opening 23 is downstream of the inlet 24, in some embodiments, sufficiently far from the inlet 24 that the particles 22 being manipulated have had time to be pushed up to the channel ceiling and concentrated into a tight stream. Hence, the distance configured is based on at least one of flow rate, magnetic field intensity and size of the particles being manipulated. In some embodiments, the distances may be in range of between about 0.5-5 cm. As for the size of the extraction opening size, in some embodiments, the size may be between about 100 to about 1000 μm.

In some embodiment, the focusing resolution achieved in the plane of the fluidic channel 10 (e.g., the x-y plane in FIGS. 1 and 2) may be supplemented by the localization field/power achieved in the normal direction (i.e., the z-axis in FIGS. 1 and 2). Since target particles 12 (e.g., cells and/or other microscale moieties) suspended in a ferrofluid 11 may be directed towards a wall of the fluidic channel 10 (e.g., externally applied magnetic fields via the magnetic field means), the average distance from the specific wall and the target particles may effectively become their corresponding average radii as the particles interact (e.g., roll) on the wall—and thus, become flow streamlines of such particles. Accordingly, in some embodiments, the exit flow rate through the extraction channel (relative to the main channel's flow rate) may be engineered to be sufficient enough to attract flow streamlines having distances from the wall slightly larger than the average radius of the focused target particles. According to such embodiments, these focused target particles may then be extracted through the extraction orifice. In some embodiments, the wall height is configured to be greater than the largest particle within the ferrofluid mix, and may be, for example, between about 10-1000 μm.

Figure 3:
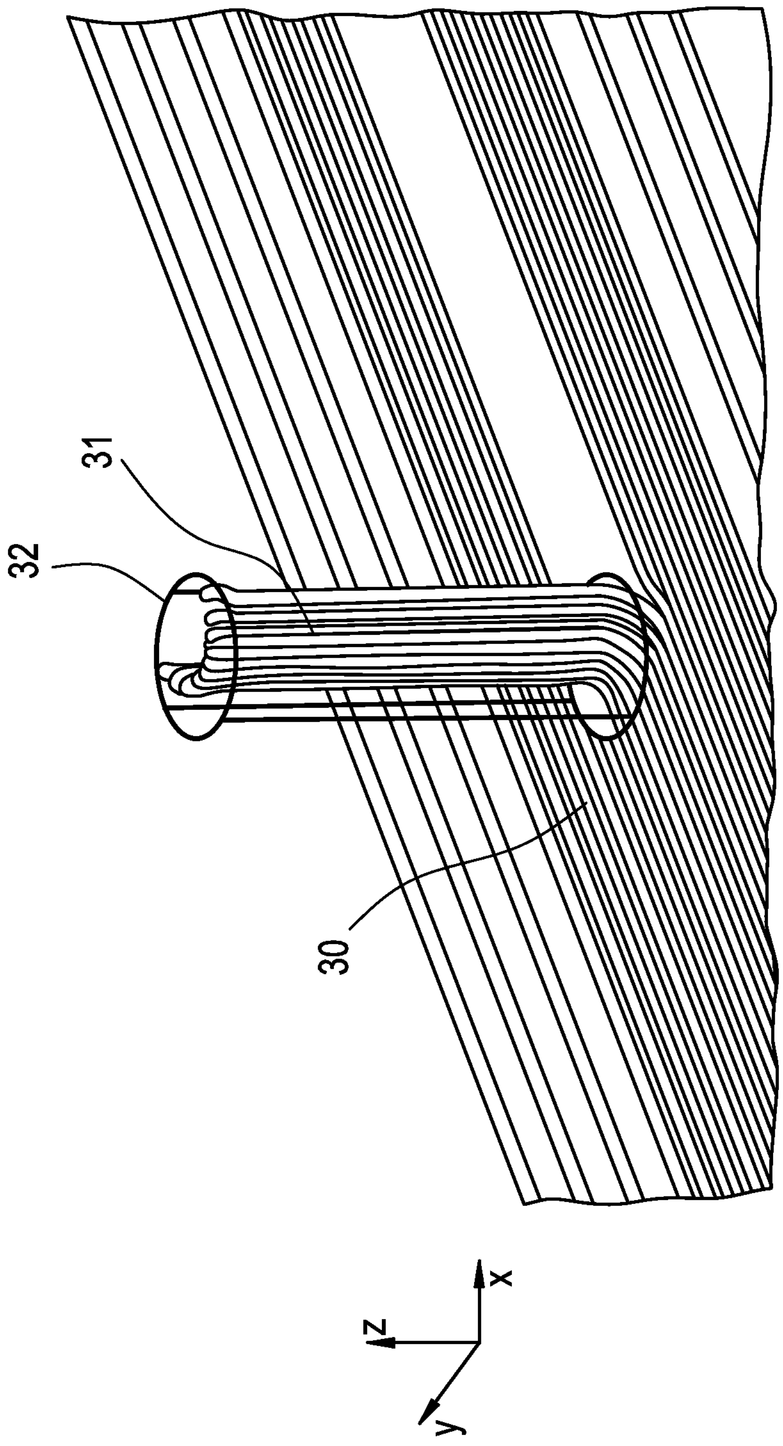
FIG. 3 is a schematic illustrating a flow simulation depicting flow streamlines in close proximity to the exit opening of a microfluidic channel according to some embodiments of the present disclosure.

For example, FIG. 3 shows a flow simulation depicting flow streamlines for target particle 31 extraction which are in close proximity to the extraction opening 32. In such embodiments, and as an example, target particles 31 (e.g., cells of about 2 microns in diameter) are pushed via at least one of the ferrofluid flow and magnetic field, to within 1 micron of the upper channel (i.e., ceiling). Conservatively, the extraction orifice/geometry may be configured to yield a predetermined extraction margin, which in some embodiments may be near or equal to 100%, less than 100% or between about 75% and 100%, or a majority. Thus in a nearly 100% margin configuration, streamlines that are about 2 microns below the channel ceiling, and (in some embodiments) co-linear with the location of the extraction opening 32, may be attracted to the extraction opening 32 for extraction (FIG. 3). In another example, for a flow channel 30 that is 50 microns deep, which may yield a boost of about 25 times (50/2) the concentration factor already achieved along the x-y plane. Hence, in some embodiments, concentration factors on the order of between about 250-500 may be realized.

Any and all references to publications or other documents, including but not limited to, patents, patent applications, articles, webpages, books, etc., presented in the present application, are herein incorporated by reference in their entirety.

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements from any other disclosed methods, systems, and devices, including any and all elements corresponding to target particle separation, focusing/concentration. In other words, elements from one or another disclosed embodiments may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

What is currently claimed is:

1. A method for extracting particles within a ferrofluid medium, the method comprising:

flowing a single flow into and through a single microfluidic channel via an inlet of the single microfluidic channel, the single microfluidic channel having first and second ends defining a straight line that delineates a first direction, the single flow comprising a mixture of a ferrofluid medium and two or more types of target particles, the single microfluidic channel including:

a second portion spaced downstream from the inlet, a first side spaced away from a second side and comprising a width of the single microfluidic channel, and a third side spaced away from a fourth side and comprising a height of the single microfluidic channel, wherein the single flow flows through the single microfluidic channel in the first direction from the inlet to the second portion;

applying a first magnetic field across the width of the microfluidic channel so as to effect an indirect force on the at least two types of different target particles within the ferrofluid medium so as to focus each of the at least two types of target particles into at least two corresponding streamlines across a width region and a height region of the single microfluidic channel, such that a first of the at least two corresponding streamlines for at least one type of the at least two types of target particles flows along the third side toward an extraction opening, wherein the extraction opening comprises a single opening in the second portion that is parallel to the single flow flowing in the first direction; and diverting the first streamline for the at least one type of the at least two types of target particles through the extraction opening, wherein the first streamline includes an exit velocity from the extraction opening in a second direction that is perpendicular to the first direction, and the remainder of the single flow continues along the single microfluidic channel past the extraction opening in the first direction.

2. The method of claim 1, wherein a type of particles corresponds to at least one of a size, shape, mass, and charge of one or more particles.

3. The method of claim 1, wherein a first type of the at least two types of target particles comprises at least one of target moieties and target biological cells.

4. The method of claim 1, wherein applying the first magnetic field includes applying a magnetic field through at least one of current-carrying electrodes and magnets.

5. The method of claim 1, further comprising adjusting the exit velocity of the first streamline by configuring the first magnetic field to effect forces on the flow affecting the exit velocity.

6. The method of claim 1, further comprising adjusting the exit velocity of the first streamline of target particles by configuring the size of the extraction opening to increase velocity.

7. The method of claim 1, further comprising adjusting the exit velocity of the first streamline of target particles by controlling the flow resistance from the extraction opening.

8. The method of claim 1, further comprising adjusting the exit velocity of the first streamline of target particles by providing at least one of a pressure sink and a flow sink arranged downstream of the extraction opening.

9. The method of claim 1, wherein the inlet comprises a single inlet of the single microfluidic channel.

10. The method of claim 1, further comprising extracting at least one of the at least two types of target particles via the extraction opening.

11. The method of claim 1, wherein the first of the at least two corresponding streamlines for one type of the at least two types of target particles interacts with the third side of the microfluidic channel by rolling along the third side.

12. A method for extracting particles within a ferrofluid medium, the method comprising:

flowing a single flow into and through a single microfluidic channel via an inlet of the single microfluidic channel, the single microfluidic channel having first and second ends defining a straight line that delineates a first direction, the single flow comprising a mixture of a ferrofluid medium and one or more types of target particles, the single microfluidic channel including:

a second portion spaced downstream from the inlet, a first side spaced away from a second side and comprising a width of the single microfluidic channel, and a third side spaced away from a fourth side and comprising a height of the single microfluidic channel, wherein the single flow flows through the single microfluidic channel in the first direction from the inlet to the second portion;

and applying a first magnetic field across the width of the microfluidic channel so as to effect an indirect force on the at least one type of target particles within the ferrofluid medium so as to focus the at least one type of target particles into a streamline across a width region and a height region of the single microfluidic channel, such that the streamline flows and interacts with the third side toward an extraction opening, wherein the extraction opening comprises a single opening in the second portion that is parallel to the single flow flowing in the first direction; and directing the streamline through the extraction opening in a second direction that is perpendicular to the first direction, wherein the remainder of the single flow continues along the single microfluidic channel past the extraction opening in the first direction.

13. The method of claim 12, further comprising extracting the at least one type of target particles via the extraction opening.

14. The method of claim 12, wherein the streamline interacts with the third side of the microfluidic channel by rolling along the third side.

15. A method for extracting particles within a ferrofluid medium, the method comprising:

providing a microfluidic channel comprising:

a first side spaced away from a second side and defining a width of the microfluidic channel, a third side spaced away from a fourth side and defining a height of the microfluidic channel, and first and second portions, wherein the first portion comprises an inlet, and the second portion is spaced downstream from the inlet and comprises an extraction opening comprising a single opening on the third side;

flowing a mixture into the inlet of the microfluidic channel, wherein the mixture comprises a ferrofluid medium and two or more types of target particles, and the mixture flows through the microfluidic channel in a first direction delineated by a straight line from the first portion to the second portion;

applying a magnetic field across the width of the microfluidic channel to focus each of the at least two types of target particles into at least two corresponding streamlines across a width region and a height region of the microfluidic channel, such that a first streamline of the at least two corresponding streamlines comprises at least one type of the target particles and flows along the third side towards the extraction opening; and diverting the first streamline through the extraction opening, wherein the first streamline includes an exit velocity from the extraction opening in a second direction that is perpendicular to the first direction, further wherein the remainder of the mixture continues along the microfluidic channel past the extraction opening in the first direction.

16. The method of claim 15, wherein the first streamline interacts with the third side of the microfluidic channel by rolling along the third side.

17. The method of claim 15, further comprising extracting at least one of the at least two types of target particles via the extraction opening.

* * * * *